United States Patent [19]

Plantholt et al.

[11] Patent Number: 4,661,839

[45] Date of Patent: Apr. 28, 1987

[54] METHOD AND APPARATUS FOR USING A VERTICAL INTERNAL TEST SIGNAL FOR PHASE CONTROL OF AN OFFSET MODULATION OF OFFSET SAMPLING SYSTEM

[75] Inventors: Martin Plantholt, Dortmund; Berthold Eiberger, Darmstadt; Hartmut Schröder, Dortmund, all of Fed. Rep. of Germany

[73] Assignee: ANT Nachrichtentechnik GmbH, Backnang, Fed. Rep. of Germany

[21] Appl. No.: 722,364

[22] Filed: Apr. 12, 1985

[30] Foreign Application Priority Data

Apr. 14, 1984 [DE] Fed. Rep. of Germany ....... 3414271

[51] Int. Cl.$^4$ .....: ......................................... H04N 7/12
[52] U.S. Cl. .................................. 358/12; 358/21 V; 358/138; 358/141
[58] Field of Search ............... 358/12, 21 V, 138, 141; 455/71; 375/43

[56] References Cited

U.S. PATENT DOCUMENTS

| | | | |
|---|---|---|---|
| 2,686,831 | 8/1954 | Dome | 358/12 |
| 2,716,151 | 8/1955 | Smith | 358/12 |
| 2,810,780 | 10/1957 | Loughlin | 358/12 |
| 3,679,816 | 7/1972 | Avins et al. | 358/21 V |
| 3,895,298 | 7/1975 | Schollmeier | 375/43 |
| 4,153,911 | 5/1979 | Isono et al. | 358/21 V |
| 4,521,803 | 6/1985 | Gittinger | 358/12 |

Primary Examiner—John W. Shepperd
Attorney, Agent, or Firm—Spencer & Frank

[57] ABSTRACT

In the transmission of a color television signal containing chrominance burst and sync signals over a Nyquist channel between a transmitting station and a receiving station, a method for modulating and synchronously demodulating the television signal according to the offset modulation and offset sampling principle. The chrominance burst or sync pulses are used as a reference signal for frequency recovery at the receiving station. An additional reference signal is generated at the transmitting station and transmitted over the Nyquist channel. The additional reference signal is utilized for phase recovery at the receiving station.

8 Claims, 15 Drawing Figures

METHOD AND APPARATUS FOR USING A VERTICAL INTERNAL TEST SIGNAL FOR PHASE CONTROL OF AN OFFSET MODULATION OF OFFSET SAMPLING SYSTEM

BACKGROUND OF THE INVENTION

The present invention relates to a method for modulation and synchronous demodulation of color television signals processed according to the offset modulation and offset sampling principle and to an arrangement for implementing this method.

A method for compatibly increasing the detail resolution in a color television transmission by offset sampling with the aid of prior and subsequent planar filtering and full frame reproduction is described in an article by Broder Wendland entitled "Enlwicklungsalternativen für zukünftige Fernsehsysteme" [Development Alternatives For Future Television Systems], published in "Fernseh- und Kinotechnik" [Television and Cinematic Art], Volume 34, No. 2, 1980. According to the method described in the cited publication, the desired signal information is transmitted over a limited bandwidth channel, with part of the signal information not being transmitted in its original spectral position but rather being placed into a carrier frequency position by the offset sampling. Further, the sampling frequency according to this method lies outside the bandwidth of the transmission channel. To reconstruct the signal information in its original spectral position, subsequent synchronous sampling is necessary at the receiving end.

SUMMARY OF THE INVENTION

It is an object of the present invention to provide a method for modulation and synchronous demodulation of color television signals processed according to the offset modulation and offset sampling principle wherein the subsequent sampling and demodulation at the receiving end occurs in synchronism with the sampling and modulation at the transmitting end while maintaining compatibility with the existing television standards (NTSC, SECAM, PAL).

It is a further object of the invention to provide a suitable arrangement for implementing this method.

The above and other objects are accomplished by the invention, in the context of the transmission of a color television signal containing chrominance burst and sync signals over a Nyquist channel between a transmitting station and a receiving station, by a method for modulating and synchronously demodulating the television signal according to the offset modulation and offset sampling principle, which includes: using the chrominance burst or sync pulses as a reference signal for frequency recovery at the receiving station; generating an additional reference signal at the transmitting station and transmitting the additional reference signal over the Nyquist channel; and utilizing the additional reference signal for phase recovery at the receiving station.

An increase in resolution compatible with the Multiplexed Analog Component (MAC) method is described in connection with direct broadcasting of signals from satellites utilizing separate component transmission, and with reference to the offset sampling method, in an article by R. Rawlings and R. Morcom entitled "Multiplexed Analogue Components—A New Video Coding System For Satellite Broadcasting" presented at the International Broadcasting Convention at Brighton, England, 1982, and published in Electron. Eng. Assoc., IEEE Conference, IBC 82, XVI+376 P., at pages 158-164. The method described in the cited paper employs a line frequent (occurs every line) clock pulse recovery burst which has a frequency that is not specified in detail.

The method according to the present invention has the advantage that the synchronization of sampling and modulation at the transmitting and receiving end is compatible with the bandwidth provided for existing transmitting and recording methods.

The present invention will be be described in greater detail with reference to the drawings.

DESCRIPTION OF THE PREFERRED EMBODIMENT

Figure 1:
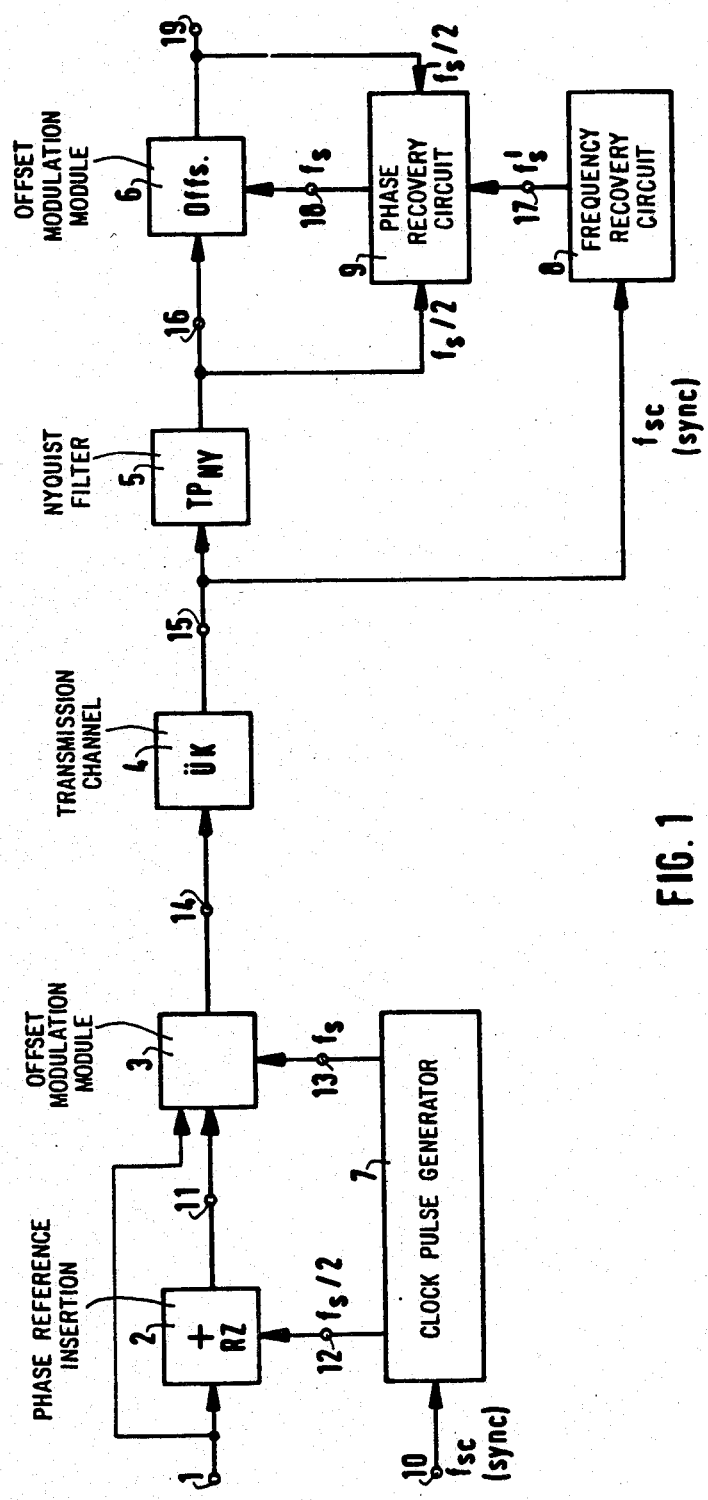
FIG. 1 is a block circuit diagram of one embodiment of a circuit for implementing the method according to the invention.
Figure 2:
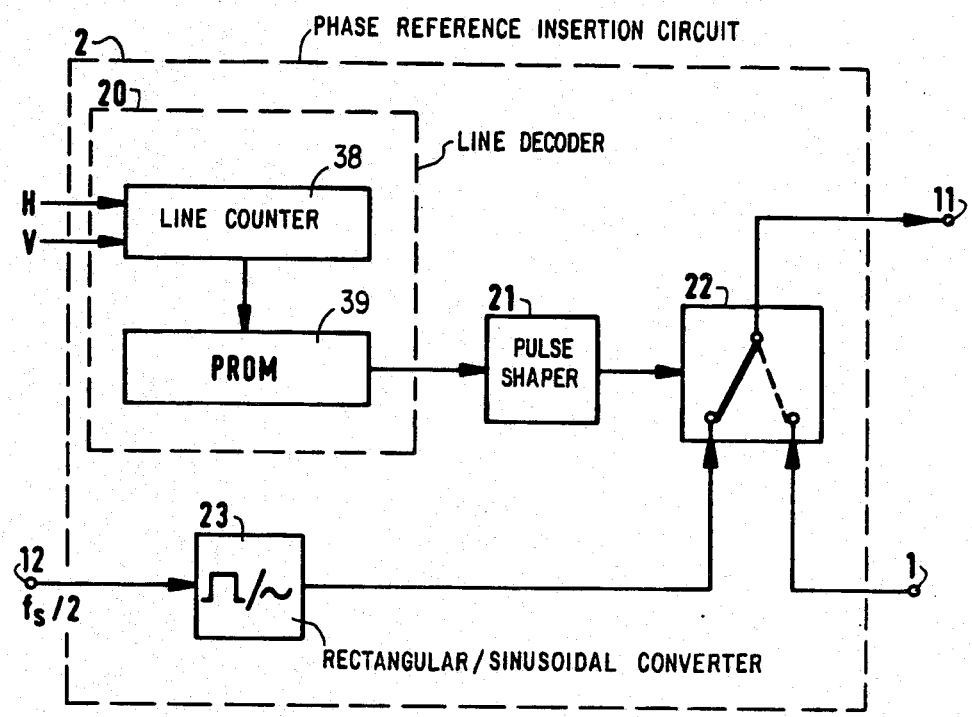
FIG. 2 is a block circuit diagram of a phase reference insertion circuit for embedding an oscillation train in reference lines (RZ) at the transmitting end in the circuit of FIG. 1.

FIG. 1 is a block circuit diagram showing the overall circuit for implementing the method according to the present invention. A video signal is fed to an input terminal 1 of a phase reference insertion circuit 2. Phase reference insertion circuit 2 also receives oscillation trains at a frequency $f_s/2$ via a terminal 12 and embeds them in a free line RZ (e.g. RZ line 15 and 328) during the vertical blanking interval of each field for the duration of that line. FIG. 2 shows in greater detail a phase reference insertion circuit 2 which can be used in the circuit of FIG. 1.

Referring to FIG. 2, the reference lines RZ into which the oscillation trains at frequency $f_s/2$ are to be embedded are detected by way of a line decoder 20 composed of a line counter 38 operated with line and field frequency pulses (H, V) and a PROM 39. A pulse shaper 21 at the output of line decoder 20 controls a switch 22 in such a manner that for the duration of each desired line, a sinusoidal oscillation train at frequency $f_s/2$ from a rectangular to sinusoidal converter 23 are available at terminal 11. For this purpose, the center contact of switch 22 is connected to terminal 11 which is one of the inputs of a subsequent offset modulation module 3 as shown in FIG. 1. The content of PROM 39 is as follows:

| address range | | data range | |
|---|---|---|---|
| decimal code | Hexcode | decimal code | Hexcode |
| 1–14 | 1 ÷ E | 0 | 0 |
| 15 | F | 1 | 1 |
| 16–327 | 10 ÷ 147 | 0 | 0 |
| 328 | 148 | 1 | 1 |
| 329–625 | 149 ÷ 271 | 0 | 0 |

Further referring to FIG. 1, the oscillation train at frequency $f_s/2$, as well as an oscillation train of frequency $f_s$, are obtained from a clock pulse generator 7 which assures that the oscillations at frequencies $f_s$ and $f_s/2$ are phase-locked to the horizontal scanning frequency. Clock pulse generator 7 operates according to the known phase-lock-loop (PLL) technique and receives, as its reference, the chrominance burst signal $f_{sc}$ or the synchronizing signal (sync) via a terminal 10.

Figure 3:
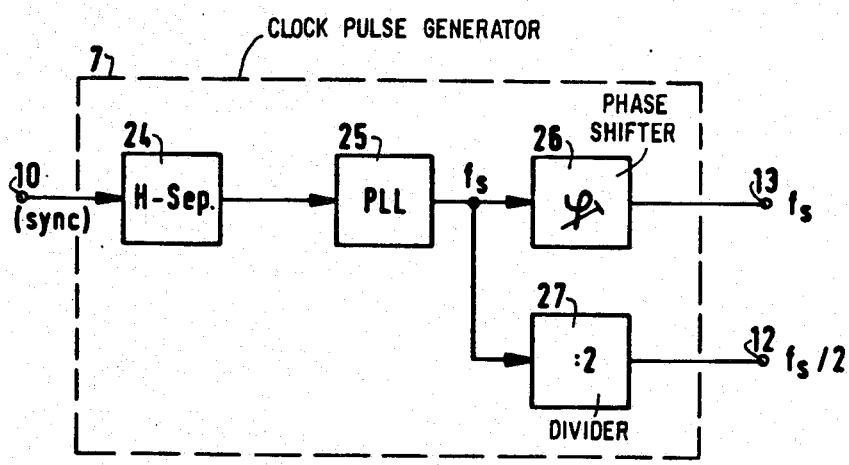
FIG. 3 is a block circuit diagram of a clock pulse generator utilized in the circuit of FIG. 1.

FIG. 3 shows an embodiment of a clock pulse generator 7 which can be used in the circuit of FIG. 1 for the case of synchronization with the sync signal. By way of a conventional separation device 24 for horizontal sync pulses (H), phase-lock-loop 25 receives line frequency pulses as reference signals. Such a separation device 24 may consist, for example, of a sync-stripper with subsequent monoflop with a time constant $\tau$, with $\tau_1/2 < \tau < \tau_1$, to yield line frequency pulses. $\tau_1$ is the duration of one line. The resulting oscillation at frequency $f_s$ is fed to terminal 13 via a phase shifter 26 which can be set to a predetermined phase shift. At terminal 12, an oscillation at frequency $f_s/2$ is available which is generated from frequency $f_s$ by means of a divider 27.

Referring again to FIG. 1, the signal present at terminal 11 is then processed in an offset modulation module 3 at the transmitting end and is put into the offset position. An embodiment for such an offset modulation module is described in German Patent Application No. P 33 44 524.9 and corresponding U.S. application Ser. No. 680,292 to Wendland et al, filed Dec. 10, 1984.

The offset position of the video signal is illustrated in FIGS. 8a–8d. With the aid of suitable pre- and post-filtering it is possible to compatibly transmit pictures with increased detail resolution in view of standard television.

Figure 8A:
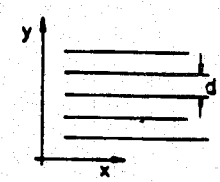
FIGS. 8a–8d are pictorial views of the offset position of the video signal.
Figure 8B:
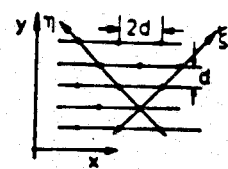
Figure 8C:
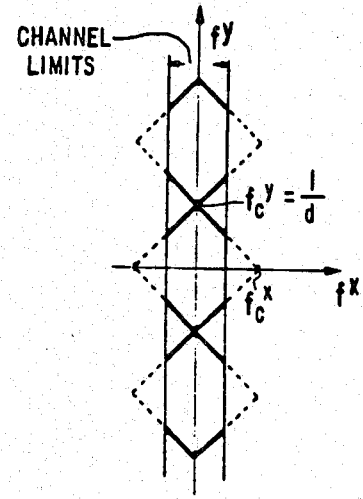
Figure 8D:
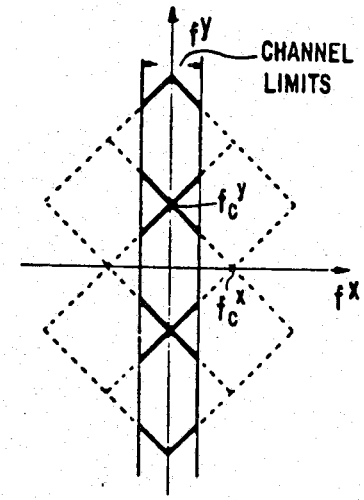

Increased vertical resolution in view of conventional TV system will result in a different vertical and horizontal resolution. An adaption, i.e. an increased horizontal resolution will be necessary. Due to the oblique effect (reduced resolution of visible perception of diagonally orientated structures) it is suitable to use the same horizontal and vertical resolution with a diagonally reduced resolution. A spectral conversion taking this into account will be achieved, if the sampled video signal will be processed by a diagonally offset filtering. FIGS. 8a–8d show the luminance spectrum of the video signal in the spatial domain (FIGS. 8a and 8b) and in the spatial frequency domain (FIGS. 8c and 8d). FIGS. 8a and 8c demonstrate line sampling with d representing the line distance, and x, y, the standard picture field coordinates. FIGS. 8b and 8d demonstrate offset sampling and diagonally filtering with $\xi$ and $\eta$ representing offset coordinates described together with FIG. 4c. The diagonally filtered luminance spectrum of FIG. 8c has a vertical limitation $f_c{}^y = 1/d$ and a horizontal limitation $f_c{}^x$. The sampling process before filtering causes a periodic repetition of the basic spectrum in the vertical spatial frequency domain, with repetion points determined by the line distance d. The standard transmission channel will not admit the entire signal spectrum to pass through but will cut, caused by its bandlimiting effect in the $f^y$-direction, all those signal components, which effect increased resolution in view of the conventional transmission system. However the transmission channel has some gaps into which those signal components could be inserted. The offset modulation technique is able to place those resolution increasing signal components into these gaps.

Using a sampling process, which is effective also in the horizontal direction and which extracts samples of the line sampled video signal in offset position, as shown in FIG. 8d, the basic spectrum in the direction of the diagonally spatial frequency domain is repeated. So the gaps previously present in the transmission channel will be filled and the entire information content of the basic spectrum will be placed in the transmission channel. In the improved receiving equipment, the resolution increased spectral components will be converted to its original place with the aid of a synchronously "post sampling" (offset filtering). In a subsequent second diagonally filtering process, tthe complete resolution, available at the transmitting end, can be utilized for the improved receiver. For the standard receiver the additional transmitted resolution increasing spectral components will cause problems in view of compatibility. To reduce this effect the resolution increasing spectral components are reduced in its amplitude, e.g. 10 dB reduction.

The improved receiver comprises an appropriate technique to restore the same amplitude level at the transmitting end before reduction. Basic spectrum and resolution increasing additional spectrum are weighted differently in its amplitudes.

The spectral components, transmitted by the transmitting channel to the receiver, have to be considered in connection with the periodic basic spectrum sampled linewise in the $f^y$-direction, and the first order spectrum, originating from offset sampling. Higher order components, which originate from sampling too, are filtered out by the transmission channel. A position of the spectrums, as being present on the transmission channel, will be achieved by an offset modulation technique, which is equivalent to the offset sampling. When using an offset modulation technique, shown and described in connection with FIG. 5, the linewise sampled and spatial filtered video signal is fed via an adder stage directly to the transmission channel, whereas the additional spectral components for increased resolution will be taken in offset position by a linear modulation process and fed to the adder stage too.

Figure 4:
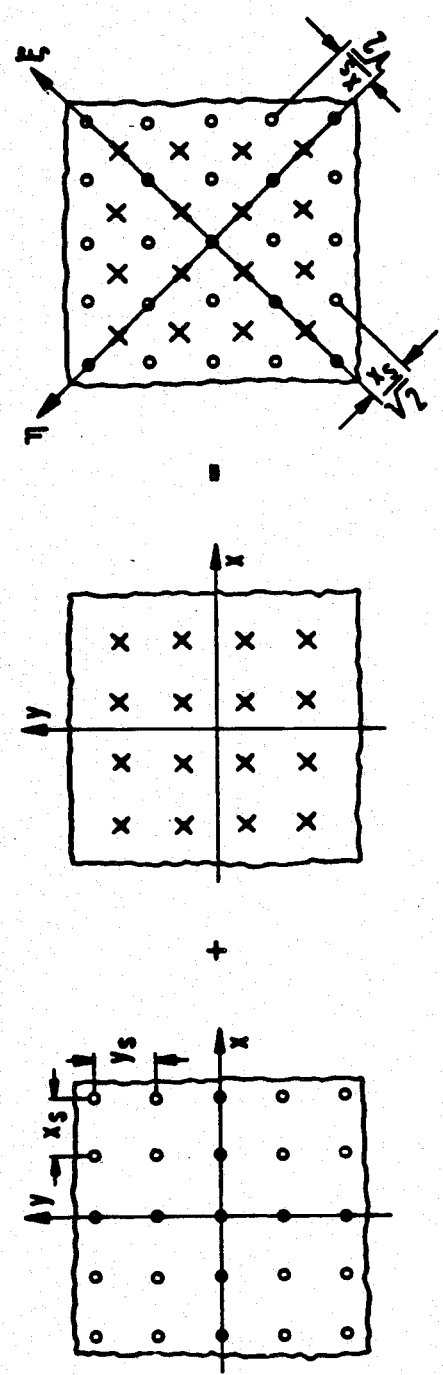
FIG. 4a–4c are pictorial views of the spatial structure of the offset modulation frequency for locations of identical phase.

FIGS. 4a–4c show pictorial views of the offset modulaton frequency $f_s$ in the spatial domain. The offset modulation frequency $f_s$ always has an x and a y component, because of the fact that the picture decomposition is done in the two dimensions x and y. The coordinates x, y of FIG. 4 correspond to the coordinates of the television picture to be processed. The locations of identical phase values of sinusoidal oscillations are shown within two successive fields. Circles and x's symbolize the locations of identical phase.

As shown in FIG. 4a, the locations of identical phase positions in field 1 are given by the pairs of values (m $x_s$; n $y_s$) in the x, y plane with m=0, 1, 2, 3, ... and n=0, 1, 2, 3, .... In field 2, however, as shown in FIG. 4b, the locations of identical phase are given by the pairs of values (1/2+m)$x_s$; (1/2+n)$y_s$. A full frame is composed of fields 1 and 2 as shown in FIG. 4c. The offset modulation frequency in the x direction is selected, for example, at $f_s{}^x$=6.75 MHz. This is one-half the clock pulse frequency of the sampling clock pulse proposed by CCIR for use in digital studios. For a 625-line interlace standard a vertical frequency in the y direction of $f_s{}^y$=312.5 c/ph results, irrespective of the selected frequency in the x direction. FIG. 4c shows a further pair of mutually orthogonal reference axes $\eta$ and $\xi$ which are rotated by 45° relative to the axes x and y. The $\eta$ and $\xi$-axes are chosen only to simplify the demonstration in a full frame. A full explanation of the $\eta$ and $\xi$-axes is published in SMPTE, Winter Conference, 1981, pages 124–131, Scarsdale, N.Y.

Offset modulation permits optimization of spatial resolution in the direction of the $f^x$ and $f^y$ axes with the aid of planar band limitation instead of the customary line interlacing for the same information quantity.

In order to obtain a balanced spatial resolution in the $f^x$- and $f^y$-directions, these frequencies are defined as follows:

$f^y$=312.5 cycles/p.h. in a 625 line system corresponding to an electrical frequency of about 7.4 MHz. $f^x=f_s{}^x$ corresponding to an electrical frequency of 8 MHz=$f_s$. 8 MHz have been chosen because of a simple relationship to the line frequency $f_1$=15.625 KHz.

8 MHz=512·15.625 KHz.

$f_s$=512 $f_1$

Figure 5:
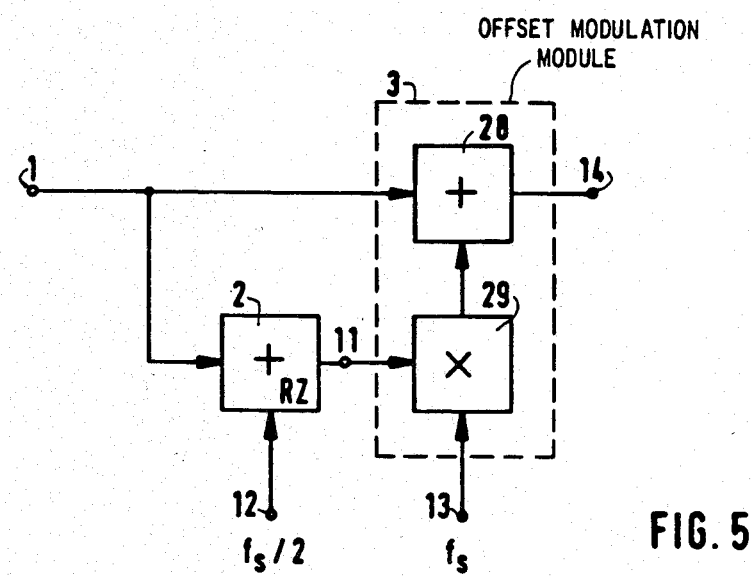
FIG. 5 is a block circuit diagram for the arrangement of a device for inserting the reference lines (RZ) in combination with an offset modulation module at the transmitting end which can be utilized in the circuit of FIG. 1.

FIG. 5 shows the arrangement of a phase reference insertion circuit and transmitter-side offset modulation module 3. The video signal at terminal 1 is fed to an adder stage 28 and, after the oscillation trains at frequency $f_s$/2 have been inserted in the intended lines by phase reference insertion circuit 2, is simultaneously modulated in multiplier 29 by frequency $f_s$ in the offset position. The multiplier output signal is then fed to adder stage 28. Adder 28 has an output terminal 14 at which the signal thus processed at the transmitting end (station) is available for transmission via transmission channel 4.

Referring to FIG. 3, the oscillations at frequency $f_s$ are shifted relative to the oscillations at frequency $f_s$/2 by phase shifter 26 before and after modulation. In principle, this phase shift may be selected as desired and must be considered at the receiving end (station) by a corresponding, oppositely directed phase shift. Preferably, the phase shift is selected to be zero. Modulating the frequency $f_s$/2 by frequency $f_s$, i.e. the multiplication of both frequencies, leads to a frequency $f_s$/2 which is affected by the original phase of frequency $f_s$. Phase shifter 26 gives the posibility to predetermine a desired phase relationship between frequencies $f_s$/2 before and after modulation, by shifting the phase of frequency $f_s$. Example:

$$2 \cos 2\pi \frac{f_s}{2} \cdot \cos 2\pi (f_s + \phi) =$$

$$\cos 2\pi \left(f_s + \phi + \frac{f_s}{2}\right) + \cos 2\pi \left(f_s + \phi - \frac{f_s}{2}\right) =$$

$$\cos 2\pi \left(\frac{f_s}{2} + \phi\right) \text{ after low pass filtering}$$

The signal thus processed at the transmitting end is then transmitted over a bandwidth limited transmission channel 4 as shown in FIG. 1. The transmitted signal appears at receiver input terminal 15 and is further bandwidth limited by means of a Nyquist filter 5.

Figure 6:
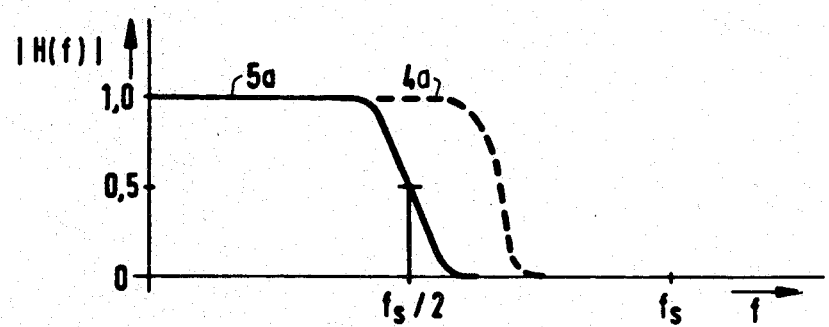
FIG. 6 is a signal diagram showing the position of the reference oscillation frequency with respect to the Nyquist channel transfer function and the transmission channel transfer function.

FIG. 6 shows the position of the embedded oscillation at frequency $f_s$/2 with respect to the transfer function 4a of transmission channel 4 and with respect to the transfer function 5a of the Nyquist filter 5. A frequency recovery circuit 8 at the receiving end operates analogously to the clock pulse generator at the transmitting end. From the signal present at terminal 15, the chrominance burst (or the sync signal, respectively) is separated and an oscillation at frequency $f_s{}'$ is produced at terminal 17 by way of the known phase-lock-loop. However, initially, the phase position of frequency $f_s{}'$ is random. Instead of phase shifter 26 as used in the clock pulse generator 7 at the transmitting end (FIG. 3), the receiver has a regulating circuit including a phase recovery circuit 9 and offset demodulation module 6. In principle, such a regulating circuit could also be employed at the transmitting end. After passing through Nyquist filter 5, the signal is fed via terminal 16 to offset demodulation module 6. This module operates in the same manner as the already described offset modulation module 3 at the transmitting end.

Figure 9:
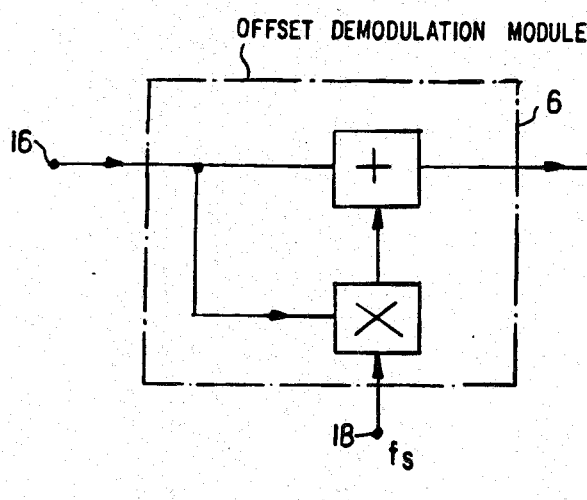
FIG. 9 is a block circuit of offset demodulation module.

Offset demodulation module 6 (FIG. 9) comprises the same components as offset modulation module 3 (i.e. multiplier 29 and adder stage 28). Both inputs of the demodulation module 6 are internally connected because no insertion circuit is needed at the receiving end.

After demodulation in module 6, the oscillation at frequency $f_s{}'$/2 appears as an oscillation at the same frequency as $f_s$/2 but with the phase position of the demodulation frequency $f_s{}'$. The oscillation frequency $f_s{}'$/2 aft terminal 19 is compared in phase recovery circuit 9 with the oscillation frequency $f_s$/2 at terminal 16 with respect to phase position and regulation is initiated so that the demodulation frequency $f_s$ at output terminal 18 of phase recovery circuit 9 results in the same phase position as the oscillation frequency $f_s$ at terminal 13 at the transmitting end.

Figure 7:
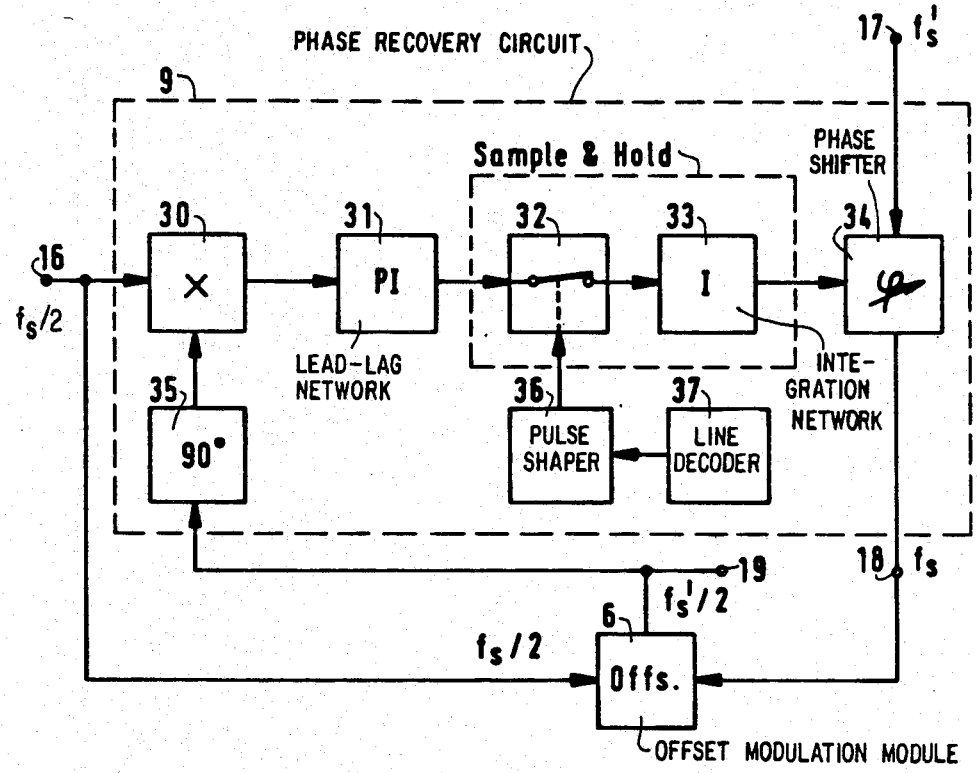
FIG. 7 is a block circuit diagram showing a phase recovery circuit at the receiving end which can be utilized in the circuit of FIG. 1.

FIG. 7 shows one preferred arrangement for the phase recovery circuit 9 together with offset demodulation module 6. The signal at frequency $f_s$/2 present at terminal 16 is fed to a first comparison input of a multiplier 30 operating as a phase detector. Multiplier 30 receives, at a second comparison input, a signal $f_s{}'$/2 which is generated by offset demodulation module 6 and which is shifted in phase by a constant phase shift of 90° in a phase shifter 35. The phase shift of 90° is necessary so that the regulating circuit finds its stable operating point at a phase shift of 0°. The output signal of multiplier 30 is fed to a lead-lag (PI) network 31 which operates as a regulating filter. The output signal of the PI network 31 is a direct voltage which is proportional to the phase difference of the signals present at the comparison inputs of multiplier 30.

Figure 10:
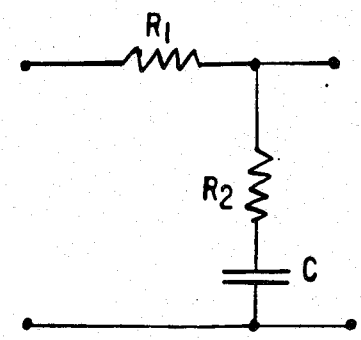
FIG. 10 is a block circuit diagram of the PI network.

The PI network 31 of FIG. 10, commonly denoted as lead-lag network, has the following transfer characteristic:

$$F(j\omega) = \frac{1 + j\omega R_2 C}{1 + j\omega(R_1 + R_2)C}$$

The direct voltage output of PI network 31 is fed via a controlled switch 32 to an integration network 33. Switch 32 and integration network 33 cooperate as a sample and hold stage. Switch 32 is controlled by way of a line decoder 37 and a pulse shaper 36 (which operate in the same manner as line decoder 38 and pulse shaper 21 in FIG. 2) so that switch 32 is connected for the duration of the reference lines. The direct voltage stored in integration network 33 controls a voltage controlled phase shifter 34. Phase shifter 34 has an operating range covering ±180° and permits regulation of the demodulated signal at frequency $f_x$ which is present at terminal 18 to reduce to zero the phase difference between the signals present at the comparison inputs of multiplier 30.

The above described arrangements are illustrated for offset modulation and demodulation for analog signal processing. In principle, it is possible to construct all of these devices for digital signal processing. The modulator and demodulator would then be replaced by a corresponding digital sampler and postsampler, respectively.

The method according to the present invention is suitable for the transmission of television signals as well as for synchronization during playback of recorded television signals recorded, for example, by means of videorecorders.

It will be understood that the above description of the present invention is susceptible to various modifications, changes and adaptations, and the same are intended to be comprehended within the meaning and range of equivalents of the appended claims.

What is claimed is:

1. In the transmission of a color television signal containing chrominance burst and sync signals over a Nyquist channel, which has a Nyquist frequency which determines its bandwidth and which extends between a transmitting station and a receiving station, by means of a method for modulating and synchronously demodulating the television signal according to the offset modulation and offset sampling principle, the improvement comprising:

using the chrominance burst or synch pulses as a reference signal for frequency recovery at the receiving station;

generating an additional reference signal at the transmitting station and transmitting the additional reference signal over the Nyquist channel, with said additional reference signal consisting of an oscillation train at said Nyquist frequency which is equal to one half of the frequency of the modulation carrier or sampling signal used in said offset modulating and demodulating method; and utilizing said additional reference signal for phase recovery at the receiving station.

2. Method as defined in claim 1, wherein the color television signal has a vertical blanking interval and said generating step includes embedding the oscillation train in a line of the vertical blanking interval at the transmitting station.

3. An arrangement for the transmission of a color television signal between a transmitting station and a receiving station wherein the color television signal contains chrominance burst and sync signals and is composed of multiple fields with each field containing a vertical blanking interval having a free line, said arrangement comprising:

a phase reference insertion circuit means, disposed at a transmitting station, for embedding a reference oscillation train having a frequency of $f_s/2$ in a free line of the vertical blanking interval of each field of the television signal; means, disposed at the transmitter station, for processing the television signal, including said references oscillation train, according to the offset modulation and offset sampling principle utilizing an offset modulation carrier or sampling signal having a frequency of $f_s$;

a transmission channel disposed between the output of said means for processing and a receiving station; and, said receiving station includes:

a Nyquist filter means, having an input for receiving the color television signal transmitted by said transmitting station and an output, for limiting the bandwidth of the received signal;

frequency recovery means, having an input connected to said transmission channel for receiving the chrominance burst or the sync signals in the color television signal transmitted by said transmitting station and an output, for producing an oscillation train at its said output having a frequency $f_s'$ which corresponds in frequency value to $f_s$ and has a random phase;

offset demodulation or postsampling means having an input connected to the output of said Nyquist filter, a control input for receiving an offset demodulation or postsampling signal and an output, said offset demodulation or postsampling means being responsive to the offset demodulation or postsampling signal for recovering the color television signal fed to said means for processing and for providing same at its said output; and, phase recovery means, having an output connected to said control input of said offset demodulation or post-sampling means, for comparing the relative phases of said reference oscillation train in the signals at said input and said output of said offset demodulation or postsampling means, and for adjusting the phase of said oscillation train of frequency $f_s'$ at said output of said frequency recovery means so as to reduce any differences between the compared phases and produce, at said control input, an offset demodulation or postsampling signal having a frequency and phase corresponding to the offset modulation or sampling signal $f_s$.

4. In an arrangement for the transmission of a color television signal between a transmitting station and a receiving station wherein the color television signal is composed of multiple fields with each field containing a vertical blanking interval having a free line and the arrangement includes means for processing the television signal according to the offset modulation and offset sampling principle utilizing an offset modulation carrier or sampling signal having a frequency of $f_s$, the improvement wherein:

said transmitting station includes:
      phase reference insertion circuit means for embedding an oscillation train having a frequency of $f_s/2$ in a free line of the vertical blanking interval of each field of the television signal; and
   said receiving station includes:
      a Nyquist filter having an input for receiving the color television signal transmitted by said transmitting station and an output for producing the embedded oscillation train of frequency $f_s/2$;

frequency recovery means having an input connected for receiving the color television signal transmitted by said transmitting station and an output for producing an oscillation train having a demodulation frequency $f_s'$ which corresponds in frequency value to $f_s$ and has a random phase;

offset demodulation or postsampling means having an input connected to the output of said Nyquist filter for receiving the embedded oscillation train of frequency $f_s/2$, a control input for receiving an offset demodulation or postsampling signal and an output, said offset demodulation or postsampling means being responsive to the offset demodulation or postsampling signal for shifting the phase of the embedded oscillation train to produce an oscillation train of frequency $f_s'/2$ which corresponds in frequency value to $f_s/2$ and is shifted in phase relative to such embedded oscillation train; and phase recovery means having a first comparison input connected to the output of said Nyquist filter for receiving the embedded oscillation train of frequency $f_s/2$, a second comparison input connected to the output of said offset demodulation or postsampling means for receiving the oscillation train of frequency $f_s'/2$, a further input connected to the output of said frequency recovery means for receiving the oscillation train of demodulation frequency $f_s'$, and an output, said phase recovery means being responsive to the phase difference between the phases of the oscillation trains at said comparison inputs for shifting the phase of the oscillation train at said further input to produce at the output of said phase recovery means the offset demodulation or postsampling signal which has a frequency and phase corresponding to the offset modulation or sampling signal $f_s$.

5. An arrangement as defined in claim 4, wherein said transmitting station further comprises: clock pulse generator means for producing an oscillation train having a frequency $f_s/2$; and offset modulation or sampling means having an input and being operative for modulating a signal at its input with the modulation or sampling signal; and wherein said phase reference insertion circuit means includes: line decoding means including a line counter responsive to line and field frequency pulses for producing an output signal corresponding to a count of the horizontal lines in a field and a PROM connected for receiving the output signal of said line counter and having an output for producing a pulse corresponding to a free line of the vertical blanking interval of such field; a pulse shaper; a rectangular to sinusoidal converter; a controllable switch having a control input connected to the output of said PROM via said pulse shaper, a center contact connected to the input of said offset modulation or sampling means, a first switch contact connected for receiving the television signal to be transmitted and a second switch contact connected to said clock pulse generator means via said rectangular to sinusoidal converter for receiving the oscillation train of frequency $f_s/2$, said controllable switch being responsive to the pulse output of said PROM for producing at said center contact the television signal with the embedded oscillation train.

6. An arrangement as defined in claim 4, wherein said transmitting station further comprises: an offset modulation or sampling means having an input means connected to said phase reference insertion circuit means for receiving the color television signal with the embedded oscillation train and being operative for modulating such signal with the offset modulation or sampling signal; and a clock pulse generator means including: horizontal sync pulse separator means connected for producing references pulses at the horizontal line frequency of the television signal; phase-lock-loop means connected to said horizontal synch pulse separator for receiving the reference pulses and having an output, said phase-lock-loop being responsive to the reference pulses for producing at its output a signal of frequency $f_s$; a settable phase shifter connected for receiving the signal of frequency $f_s$ and having an output connected to said offset modulation or sampling means, said phase shifter shifting the phase of the signal of frequency $f_s$ by a predetermined amount to produce at its output the modulation or sampling signal; and a frequency divider having an input connected to the output of said phase-lock-loop means for receiving the signal of frequency $f_s$ and having an output connected to said phase reference insertion circuit means, said frequency divider being operative to divide the frequency of the signal at its input to produce at its output a signal at the frequency $f_s/2$ which constitutes the oscillation train to be embedded by said phase reference insertion circuit means.

7. An arrangement as defined in claim 6, wherein said offset modulation or sampling means includes: a multiplier having one input connected to said phase reference insertion circuit means for receiving the television signal containing the embedded oscillation train, a second input connected to the output of said settable phase shifter and an output for producing the television signal contacting the embedded oscillation train modulated by the modulation or sampling signal of frequency $f_s$; and an adder having one input connected for directly receiving the television signal without the embedded oscillation train and a second input connected to the output of said multiplier.

8. An arrangement as defined in claim 4, wherein said phase recovery means comprises:

a 90° phase shifter;

a multiplier having first and second inputs which constitute said first and second comparison inputs, respectively, the first input of said multiplier being connected for receiving the embedded oscillation train from said Nyquist filter, the second input of said multiplier being connected to said demodulation and sampling means via said 90° phase shifter for receiving the oscillation train of frequency $f_s'/2$ shifted by 90°, said multiplier having an output and producing a signal at such output in response to the phase difference between the oscillation trains present at the first and second inputs of said multiplier;

a lead-lag network having an input connected for receiving the signal at the output of said multiplier and an output for producing a direct voltage signal which is proportional to the phase difference between the oscillation trains present at the first and second inputs of said multiplier;

a pulse shaper;

line decoder means having an output and being connected for producing at its output an output pulse corresponding to a free line of the vertical blanking interval of the transmitted television signal;

sample and hold means having one input connected to the outputof said lead-lag network, a control input connected to the output of said line decoder means via said pulse shaper and an output, said sample and hold means being operative for sampling the direct voltage signal at the output of said lead-lag network for the duration of the pulse at the control input of said sample and hold means and for producing an output signal corresponding to the sampled direct voltage signal; and a voltage controlled phase shifter having a control input connected to the output of said sample and hold means, another input connected to the output of said frequency recovery means and an output connected to the control input of said offset demodulation or sampling means, said voltage controlled phase shifter being responsive to the output signal of said sample and hold means for shifting the phase of the oscillation train having a demodulation frequency of $f_x'$ to produce the offset demodulation or sampling signal.

* * * * *